UNITED STATES PATENT OFFICE.

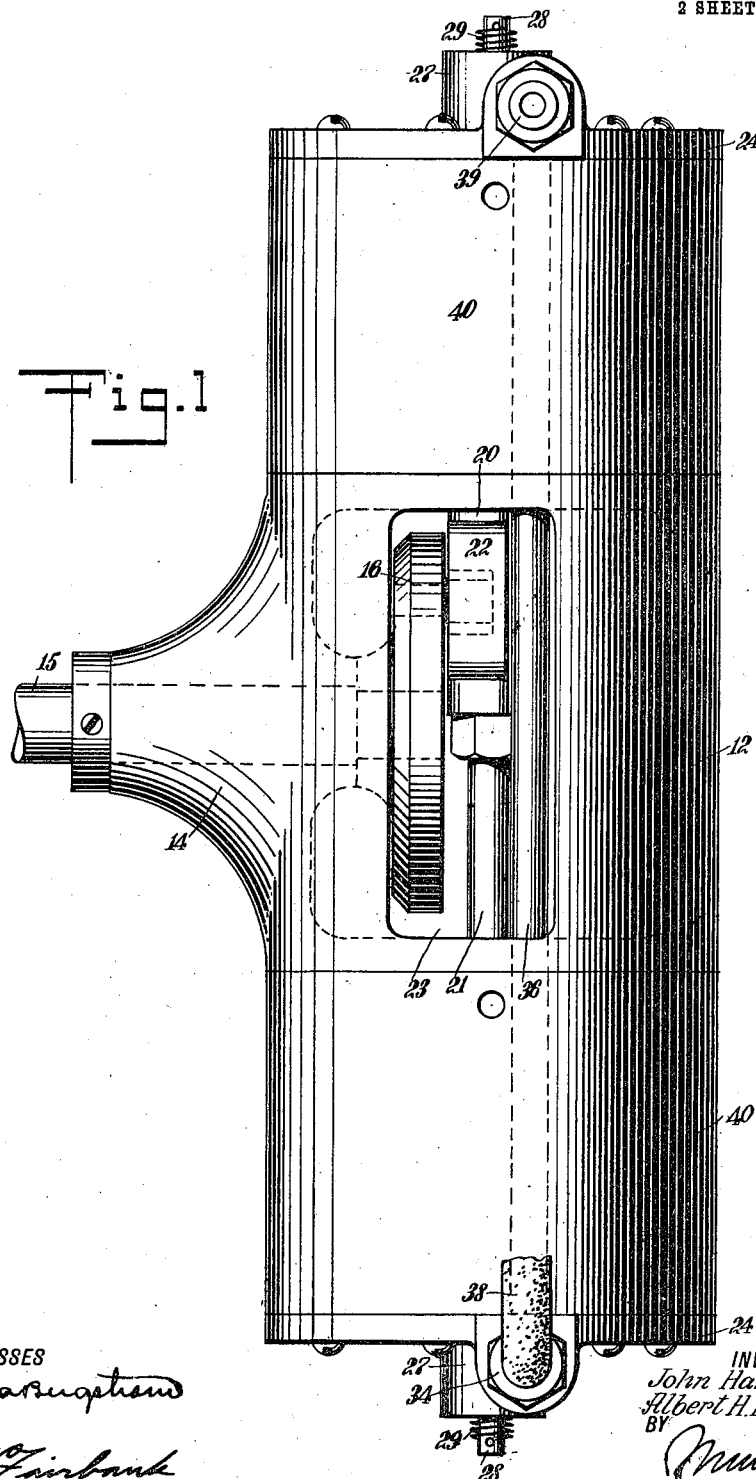

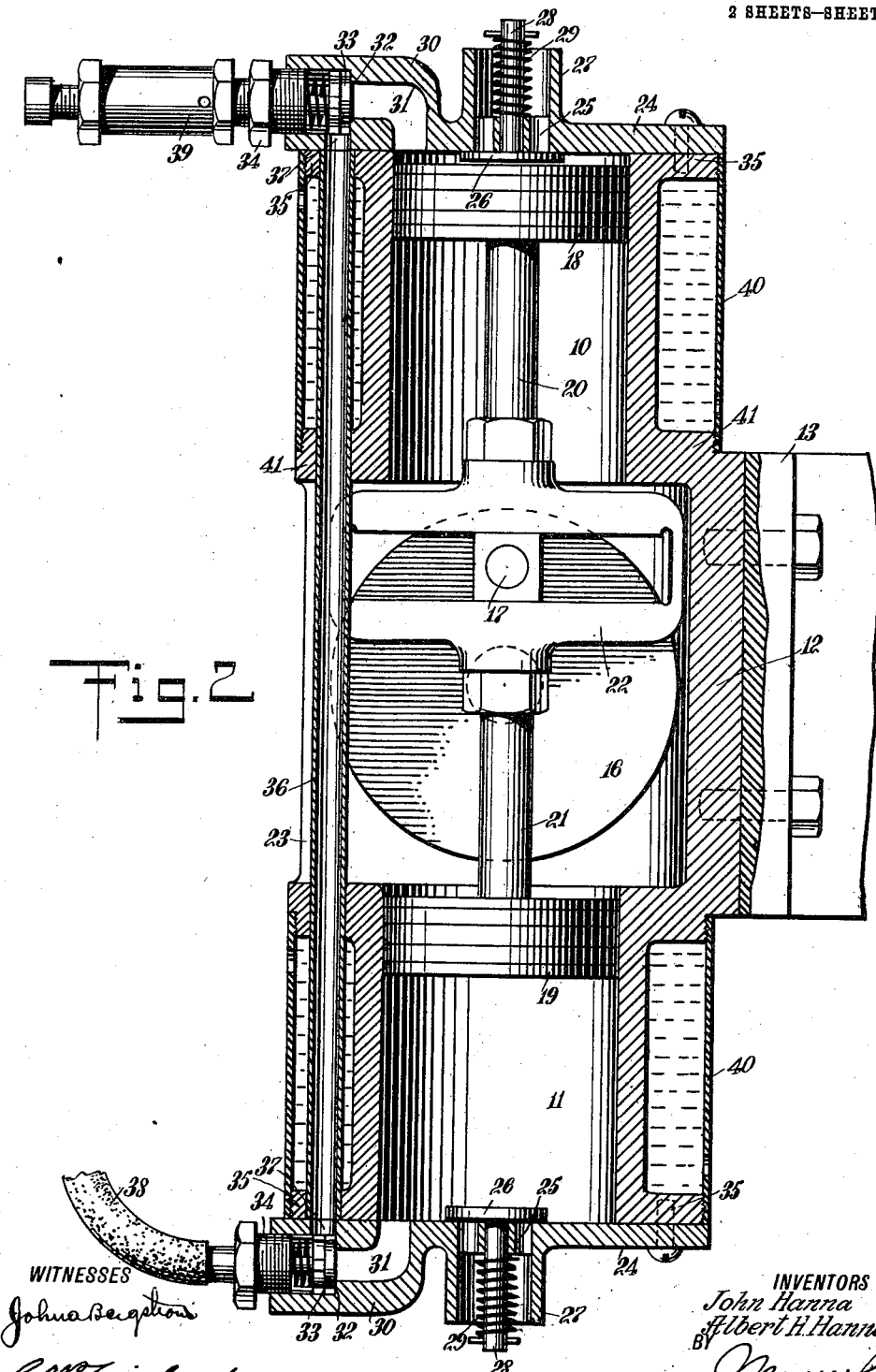

JOHN HANNA AND ALBERT HENRY HANNA, OF TROY, NEW YORK.

AIR-COMPRESSOR.

975,233.  Specification of Letters Patent.  Patented Nov. 8, 1910.

Application filed October 29, 1909. Serial No. 525,278.

*To all whom it may concern:*

Be it known that we, JOHN HANNA and ALBERT H. HANNA, both citizens of the United States, and residents of Troy, in the county of Rensselaer and State of New York, have invented a new and Improved Air-Compressor, of which the following is a full, clear, and exact description.

This invention relates to certain improvements in air pumps, and more particularly to a form of pump adapted to be secured to the chassis or other part of a motor vehicle to compress air to be used in conjunction with the starting device or the steering device, or to operate the brakes, or for the inflation of the tires, or for any other desired purpose. Our improved pump when so used may be operatively connected to the engine in any suitable manner, there being preferably included in the connections, a sliding gear, clutch or other device, whereby the compressor is thrown out of operation automatically when the air tank has the required pressure, or may be thrown in or out at will when it is desired to inflate the tires. It is evident that our improved pump may be used for other purposes than the compression of air, and might be used in other localities or in other positions than upon a motor vehicle. The pump illustrated is of that type in which there are two cylinders in alinement with each other and having pistons rigidly connected together and reciprocated by means disposed between the two pistons.

One special object of the invention is to provide for the delivery of the air from both cylinders through a single conduit and the provision of a safety valve for both cylinders, the outlet conduit and the safety valve being interchangeable in position.

A further object of the invention is to provide an improved form of jacket and support therefor, for cooling the separate cylinders. This jacket may be connected with the regular water-cooling system of the engine on the automobile or a separate cooling system may be used.

Other objects and advantages of our improved pump may be set forth hereinafter and the novel features particularly pointed out in the claims.

Reference is to be had to the accompanying drawings, forming a part of this specification, in which similar characters of reference indicate corresponding parts in both the figures, and in which—

Figure 1 is a side elevation of a pump constructed in accordance with our invention; and Fig. 2 is a longitudinal section through the pump taken in a plane at right angles to the plane of Fig. 1.

Our improved pump includes two cylinders 10 and 11, in alinement with each other and preferably formed of a single casting. The two cylinders are spaced apart and are both integral with the body 12 of the casting. The body is hollow and substantially cylindrical, but presents one flat face whereby it may be rigidly secured to any suitable form of support 13. In using the pump in a motor vehicle, the support 13 is preferably the engine base on one side member of the chassis. On one side of the body, there is provided an outwardly-extending boss 14; constituting a bearing for a shaft 15 extending into the body. The shaft at its inner end carries a disk 16, having an eccentrically-mounted wrist pin 17. Within the two cylinders are two pistons 18 and 19, having piston rods 20 and 21. Both of the piston rods are connected to a slotted cross-head 22, through which the wrist pin 17 extends. The slot extends at right angles to the general direction of the piston rods and is of such length that when the shaft 15 and its disk 16 are rotated, the pistons will be reciprocated within the cylinders. To facilitate the insertion of the cross-head and the disk, and to permit an adjustment of the parts, the body is preferably provided with an opening 23 in one side thereof. This opening is normally covered by a removable nameplate, so that the body portion is closed and dirt or other foreign substance is prevented from gaining access to the working parts.

Each cylinder has a detachable cylinder head 24, rigidly secured in place. Each cylinder head is provided with an inlet port 25 in the center of the cylinder head, and the port is normally closed by a valve 26 in engagement with the inner surface of the head. The port is surrounded by an outwardly-extending boss 27, and the valve stem 28 extends out through this boss and is surrounded by a coil spring 29 within the boss and normally tending to hold the valve against the inner surface of the head to close the port. A reduction in pressure within the cylinder, permits the valve to open inwardly and permits the free admission of air from the atmosphere to the cylinder.

Adjacent one end of the cylinder head, a boss 30 is formed with an outlet passage 31 leading from the interior of the cylinder and outward radially to the edge of the head. Within the outlet passage there is provided a valve seat 32 for a check valve 33, which opens outwardly and prevents the return movement of compressed air through the outlet passage to the cylinder. The valve 33 is normally held closed by a suitable spring, the tension of which may be controlled by the screwing of a collar 34 into the outer end of the passage. The two cylinder heads are similar, one being made right and the other left, in order that the vertical portions of the two heads may come in the same plane in respect to the axis of the cylinder, and each piston is single-acting, that is, it operates to draw in air while moving toward the opposite cylinder, and operates to compress and deliver the air during the return movement. In order that only a single delivery conduit may be employed, we provide means within the pump for connecting the two outlet passages beyond the check valves in said pistons.

Each cylinder at its outer end is provided with an annular flange 35, of a diameter substantially or nearly equal to the diameter of the center body portion of the casting. Each of these flanges is provided with an aperture therethrough, and a pipe 36 connects the two apertures and extends through annular portions of the body adjacent the inner ends of the two cylinders, as is shown particularly in Fig. 2. The pipe is disposed parallel to the two cylinders and is within the outer perimeter of the pump. It is thus protected against injury, and is supported not only at each end, but also at two intermediate points, that is, adjacent the inner ends of the two cylinders. Each cylinder head is provided with a passage 37, leading from the passage 31 beyond the check valve in the latter and arranged in alinement with the end of the pipe 36, so that the air after passing the check valve in either cylinder head, may flow into the pipe 36.

Detachably connected with the outer end of the passage 31 of one of the cylinder heads, is an outlet conduit 38, through which the air from both cylinders may be delivered to the inlet valve of the tank or to the inlet valve of the tire to be inflated, or to any other point at which it is desired to employ the compressed air. Detachably connected with the collar 34 on the other cylinder head, is any suitable form of safety valve 39, whereby the pressure within the pipe 36 and the delivery conduit 38 may be kept below a predetermined limit. We have not shown the details of the safety valve, as any suitable form of spring-pressed safety valve might be employed, and the valve per se constitutes no portion of our invention. It is merely essential that this safety valve be so designed that if the pressure within the pipe 36 and delivery conduit 38 exceeds the pressure which the tire is designed to stand, or the predetermined pressure of the tank, the valve will open and the excess air will escape. The collars 34 being identical, the delivery conduit 38 and the safety valve 39 are interchangeable, and the conduit may thus be connected to whichever end of the cylinder is most convenient, and the safety valve may be connected to the other end.

In using the pump for compressing air or other gas, at comparatively low pressure, the heat of compression may be readily dissipated by direct radiation to the surrounding atmosphere, but if a higher pressure is desired, it is found advantageous to cool the cylinders by the use of water jackets. In the pump illustrated, we have provided each cylinder with a jacket 40, formed of a sheet metal tube concentric with the cylinder. At the inner end of the cylinder, the body forms an annular flange 41, through which the pipe 36 extends, and this flange is of substantially the same diameter as the flange 35. The sheet metal jacket encircles these two flanges and may be heated and shrunk on or may be screwed on, as found most desirable. The jacket is limited in its movement in one direction by the body of the pump, and at its outer end it preferably terminates flush with the outer surface of the flange 35. The cylinder head is made slightly larger than the flange 35, so that it engages with the end of the jacket and tends to prevent longitudinal movement of the jacket in the opposite direction. The jacket is of the same diameter as the center portion or body of the pump, and thus the pump presents the appearance of a single cylinder of uniform diameter. The pipe 36 extends through the jacket and may thus partially aid in cooling the air, and the jacket serves to conceal and protect the pipe.

Having thus described our invention, we claim as new and desire to secure by Letters Patent:

1. A pump having two cylinders in alinement with each other and each provided with an outwardly-extending flange at its outer end, an intermediate body portion integral with both of said cylinders and constituting annular flanges at the inner ends of said cylinders, cylinder heads at the outer ends of said cylinders, an outlet passage in each cylinder head, valves in said outlet passages, and a pipe connecting said outlet passages beyond said valves and extending through said flanges and said body portion.

2. A pump having two cylinders in alinement with each other, pistons within said cylinders, means intermediate said cylinders for reciprocating the same simultaneously, each of said cylinders having an outwardly-extending flange adjacent its outer end, a cylinder head secured to each flange, an outwardly-extending boss upon each cylinder head, an outwardly-opening automatic outlet valve within each boss, and a conduit extending lengthwise of said cylinders and extending through said flanges and communicating with the interior of each of said bosses beyond the outlet valve in the latter.

3. A pump having two cylinders in alinement with each other, pistons within said cylinders, means intermediate said cylinders for reciprocating the same simultaneously, each of said cylinders having an outwardly-extending flange adjacent its outer end, a cylinder-head secured to each flange, an outwardly-extending boss upon each cylinder head, an outwardly-opening automatic outlet valve within each boss, a conduit extending lengthwise of said cylinders and extending through said flanges and communicating with the interior of each of said bosses beyond the outlet valve in the latter, a delivery conduit connected to one of said bosses, and a safety valve connected to the other boss, said safety valve and said delivery conduit being interchangeable.

4. A pump having two cylinders in alinement with each other, an intermediate body portion, pistons within said cylinders, means within said body portion for reciprocating said pistons simultaneously in the same direction, a removable cylinder head for the outer end of each cylinder, each of said cylinder heads having an inwardly-opening inlet valve and a discharge passage, an outwardly-opening check valve within said cylinder head for controlling said passage, said passage having two branches beyond said check valve, a conduit supported by said cylinders and independent of said cylinder heads and having its opposite ends registering with one branch of each passage when said cylinder heads are in place, and a delivery conduit adapted to be connected to the other branch of either of said passages.

In testimony whereof we have signed our names to this specification in the presence of two subscribing witnesses.

JOHN HANNA.
ALBERT HENRY HANNA.

Witnesses:
ALFRED J. NOLIN,
FRANK A. SNYDER.